United States Patent
Chan (10) Patent No.: US 9,535,681 B2
(45) Date of Patent: *Jan. 3, 2017

(54) VALIDATING AVAILABILITY OF FIRMWARE UPDATES FOR CLIENT DEVICES

(71) Applicant: QUALCOMM TECHNOLOGIES, INC., San Diego, CA (US)

(72) Inventor: Adrian Chan, Sunnyvale, CA (US)

(73) Assignee: QUALCOMM Incorporated, San Diego, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 14/215,514

(22) Filed: Mar. 17, 2014

(65) Prior Publication Data

US 2015/0067667 A1 Mar. 5, 2015

Related U.S. Application Data

(63) Continuation-in-part of application No. 14/165,066, filed on Jan. 27, 2014, and a continuation-in-part of
(Continued)

(51) Int. Cl.
| | |
|---|---|
| *G06F 15/173* | (2006.01) |
| *G06F 15/16* | (2006.01) |
| *G06F 9/445* | (2006.01) |
| *G06F 17/30* | (2006.01) |
| *H04W 4/00* | (2009.01) |

(Continued)

(52) U.S. Cl.
CPC ........... *G06F 8/65* (2013.01); *G06F 17/30174* (2013.01); *H04L 63/08* (2013.01); *H04L 67/1095* (2013.01); *H04L 67/18* (2013.01); *H04W 4/001* (2013.01); *H04W 4/02* (2013.01); *H04L 63/083* (2013.01); *H04L 63/0823* (2013.01); *H04L 67/14* (2013.01)

(58) Field of Classification Search
CPC ........... H04L 63/0823; H04L 2463/102; H04L 63/08; H04L 63/083
USPC ................................................. 709/202, 225
See application file for complete search history.

(56) References Cited

U.S. PATENT DOCUMENTS

| | | |
|---|---|---|
| 7,992,002 B2 | 8/2011 | Bradbury |
| 8,015,114 B1 | 9/2011 | Nachenberg |

(Continued)

OTHER PUBLICATIONS

International Search Report and Written Opinion—PCT/US2014/013212—ISA/EPO—Aug. 15, 2014.
(Continued)

*Primary Examiner* — Hieu Hoang
(74) *Attorney, Agent, or Firm* — Paradice and Li LLP (57) ABSTRACT

Systems and methods are described that comprise receiving at a platform device data of client devices. The device data is stored in device files. The device files are replicated at multiple distribution platforms. The device file corresponding to each client device is downloaded to the device, and the downloading is performed from a distribution platform geographically closest to the client device. The downloaded device file is evaluated with the device data on the client device and a determination is made when a new device file is available for the client device. The new device file is downloaded from an update server when it is determined that the new device data file is available.

24 Claims, 3 Drawing Sheets

Related U.S. Application Data application No. 14/165,109, filed on Jan. 27, 2014, and a continuation-in-part of application No. 14/165,157, filed on Jan. 27, 2014.

(60) Provisional application No. 61/798,347, filed on Mar. 15, 2013, provisional application No. 61/794,977, filed on Mar. 15, 2013.

(51) Int. Cl.
*H04W 4/02* (2009.01)
*H04L 29/06* (2006.01)
*H04L 29/08* (2006.01)

(56) References Cited

U.S. PATENT DOCUMENTS

| | | | |
|---|---|---|---|
| 8,234,408 B2 | 7/2012 | Jungck | |
| 8,316,135 B2 | 11/2012 | Ford | |
| 8,495,618 B1* | 7/2013 | Inbaraj | G06F 8/665 |
| | | | 717/172 |
| 8,650,283 B1 | 2/2014 | Chang et al. | |
| 8,745,746 B1 | 6/2014 | Jain | |
| 2002/0045437 A1* | 4/2002 | Kesler | H04M 1/67 |
| | | | 455/411 |
| 2004/0030880 A1* | 2/2004 | Kitagawa | G06F 9/4411 |
| | | | 713/1 |
| 2005/0125553 A1* | 6/2005 | Wu | H04W 4/02 |
| | | | 709/233 |
| 2006/0080656 A1 | 4/2006 | Cain et al. | |
| 2006/0200856 A1 | 9/2006 | Salowey et al. | |
| 2007/0006309 A1 | 1/2007 | Herbert et al. | |
| 2007/0019236 A1* | 1/2007 | Sando | G06F 3/1204 |
| | | | 358/1.15 |
| 2007/0050762 A1 | 3/2007 | Chen et al. | |
| 2007/0226343 A1 | 9/2007 | Bishop | |
| 2007/0265830 A1* | 11/2007 | Sidhu | H04M 3/42382 |
| | | | 704/9 |
| 2008/0005733 A1* | 1/2008 | Ramachandran | G06F 8/65 |
| | | | 717/168 |
| 2008/0140714 A1 | 6/2008 | Rhoads et al. | |
| 2008/0304421 A1 | 12/2008 | Ramasubramanian et al. | |
| 2009/0044056 A1* | 2/2009 | Itoh | G06F 11/0733 |
| | | | 714/31 |
| 2009/0144395 A1* | 6/2009 | DeSalvo | G06F 17/30902 |
| | | | 709/219 |
| 2009/0177806 A1* | 7/2009 | Nishikawa | G06F 8/65 |
| | | | 710/10 |
| 2009/0199176 A1 | 8/2009 | Nath et al. | |
| 2009/0282128 A1* | 11/2009 | Le | G06F 8/65 |
| | | | 709/219 |
| 2010/0082792 A1* | 4/2010 | Johnson | G01D 4/004 |
| | | | 709/223 |
| 2010/0130178 A1 | 5/2010 | Bennett et al. | |
| 2010/0228819 A1* | 9/2010 | Wei | G06F 9/505 |
| | | | 709/203 |
| 2010/0235321 A1 | 9/2010 | Shukla et al. | |
| 2011/0185303 A1 | 7/2011 | Katagi et al. | |
| 2011/0238988 A1 | 9/2011 | Tanaka et al. | |
| 2011/0264730 A1* | 10/2011 | Dattagupta | H04L 12/2809 |
| | | | 709/203 |
| 2012/0099024 A1 | 4/2012 | Ryu et al. | |
| 2012/0167185 A1 | 6/2012 | Menezes et al. | |
| 2012/0191769 A1* | 7/2012 | Lovinger | H04L 61/1505 |
| | | | 709/201 |
| 2012/0206760 A1* | 8/2012 | Asahara | G03G 15/5091 |
| | | | 358/1.15 |
| 2012/0207079 A1 | 8/2012 | Wang et al. | |
| 2012/0216259 A1* | 8/2012 | Okamoto et al. | |
| 2013/0007190 A1 | 1/2013 | Kumar et al. | |
| 2013/0077664 A1 | 3/2013 | Lee | |
| 2013/0090939 A1 | 4/2013 | Robinson et al. | |
| 2013/0125107 A1* | 5/2013 | Bandakka | G06F 8/665 |
| | | | 717/171 |
| 2013/0191929 A1* | 7/2013 | Yin | G06F 21/31 |
| | | | 726/28 |
| 2013/0198730 A1* | 8/2013 | Munireddy | G06F 8/665 |
| | | | 717/170 |
| 2013/0261821 A1 | 10/2013 | Lu et al. | |
| 2014/0082117 A1 | 3/2014 | Unhale et al. | |
| 2014/0133656 A1* | 5/2014 | Wurster | H04L 9/0637 |
| | | | 380/270 |
| 2014/0237130 A1 | 8/2014 | Chan | |
| 2014/0237131 A1 | 8/2014 | Chan | |
| 2014/0244789 A1 | 8/2014 | Chan | |
| 2015/0058834 A1 | 2/2015 | Chan | |
| 2015/0319143 A1 | 11/2015 | Kim et al. | |

OTHER PUBLICATIONS

International Search Report and Written Opinion—PCT/US2014/030336—ISA/EPO—Oct. 23. 2014.

\* cited by examiner

VALIDATING AVAILABILITY OF FIRMWARE UPDATES FOR CLIENT DEVICES

RELATED APPLICATIONS

This application claims the benefit of U.S. Patent Application No. 61/798,347, filed Mar. 15, 2013.

This application claims the benefit of U.S. Patent Application No. 61/794,977, filed Mar. 15, 2013.

This application is a continuation in part of U.S. patent application Ser. No. 14/165,066, filed Jan. 27, 2014.

This application is a continuation in part of U.S. patent application Ser. No. 14/165,109, filed Jan. 27, 2014.

This application is a continuation in part of U.S. patent application Ser. No. 14/165,157, filed Jan. 27, 2014.

TECHNICAL FIELD

The embodiments herein relate to processing systems and, more particularly, to methods and apparatus to uniquely determine availability of client device software updates and process the software updates.

BACKGROUND

Systems and methods are needed for validating availability of firmware updates for client devices.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

One or more of a system, device or apparatus, and associated methods are described herein that enable a distributed processing method to efficiently process client inquires regarding the availability of newer firmware updates for the requesting device or any corresponding software modules hosed on the device. As the numbers of these requests can be very large, for example in the tens or hundreds of millions, the embodiments described herein provide a relatively higher level of efficiency for these over-the-air updates.

As used herein, the term "client" includes but is not limited to one or more of software modules, applications, and mobile communication devices having or coupled to at least one of a wired and wireless communication interface to interact with server software application. The server software application of an embodiment, also referred to herein as the server application, executes or runs on one or more of a local processing device (e.g., personal computer, server, etc.) and a service the provides the FOTA service. The service providing the FOTA service includes but is not limited to at least one of a public service, private service, and a personal service deploying as at least one of a cloud and non-cloud based service providing the FOTA service.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Systems and methods are generally described herein that comprise receiving at a platform device data of client devices. The device data is stored in device files. The device files are replicated at multiple distribution platforms. The device file corresponding to each client device is downloaded to the device, and the downloading is performed from a distribution platform geographically closest to the client device. The downloaded device file is evaluated with the device data on the client device and a determination is made when a new device file is available for the client device. The new device file is downloaded from an update server when it is determined that the new device data file is available.

Figure 1:
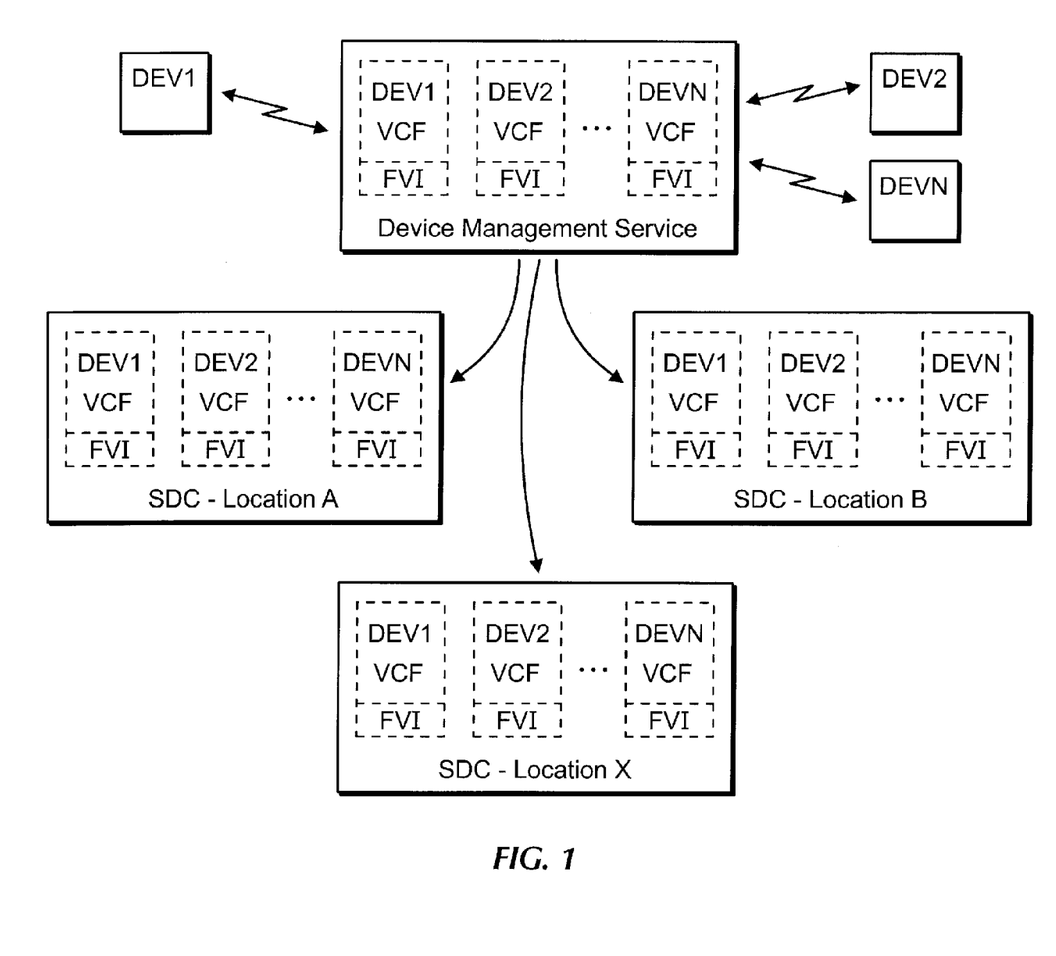
FIG. 1 is a block diagram of a device management service, under an embodiment.

FIG. 1 is a block diagram of a device management service, under an embodiment. The device management service includes a device management platform, system and/or components at a centralized location. The device management platform communicates with one or more clients, which as described herein include client devices, software modules, and/or applications. Communication between the device management platform and the clients involves the use of a unique identification, referred to herein as innodevID, as described in detail herein.

The device management service also includes a content distribution network (CDN) that is coupled to the device management platform. The CDN includes numerous software distribution centers, each of which is located in a different geographical region or area than the device management platform and any other software distribution center.

The device management platform receives information or data from each device that includes the device firmware version information. This firmware version information corresponding to each device is stored at the device management platform in separate device-specific version control files. Thus, for each device registered with the device management platform, the platform includes a version control file (VCF) that includes the firmware version information of the corresponding device.

While the firmware version information for the devices is kept in separate device specific version control files (VCFs) at the device management platform, all version control files are replicated to numerous software distribution centers of the CDN. The replicated version control files are publicly readable but are write-restricted so that they can only be written by authorized server software applications in order to prevent corruption or contamination of the files. The software distribution centers, which are each located in a different geographical region or area than both the device management platform and others of the software distribution centers, are coupled or connected to the device management platform via one or more of public networks like the internet, and private networks.

When a new firmware package becomes available for a specific device model, the service provider updates the corresponding files inside the respective configuration file specific to that device model at the device management service. The device management service subsequently propagates the new firmware files via the CDN to each of the software distribution centers where the firmware files are stored.

The client software hosted in the device periodically downloads via the internet, for example, the corresponding firmware version control file from the software distribution center in closest proximity to the device. The client software then evaluates whether a new firmware package is available for the device model by comparing the firmware version currently residing on the device with the firmware version received or downloaded from the software distribution center in order to determine if a newer version of firmware is available.

When it is determined that a newer version of firmware is available that that currently residing on the device, then the client software will contact the appropriate Firmware-Over-the-Air (FOTA) server to follow the FOTA firmware download and upgrade transaction processing for the newer firmware image. Firmware Over-the-Air (FOTA) is used for upgrades to mobile telephones and other portable computing devices. The FOTA is also referred to as software update, firmware update or device management, but is not so limited. Using FOTA, firmware updates are pushed or issued directly "over the air" to the device from the mobile phone service provider or other intermediary.

If it is determined that no firmware update available, the client waits for its next subsequent self-check cycle to query the closest software distribution center for any new version information. The FOTA server is not contacted by the device until such time as a newer firmware version is available for that device under the embodiments herein.

As described above, communication between the device management service and the client devices involves the use of a unique identification issued to each device. The unique identification, which is referred to herein as innodevID, is issued to each device that is brought to a mobile device management service of a service provider. The mobile device management service of an embodiment is referred to herein as a care service or, alternatively, an activeCare service. Communication with the device is enabled using a pre-specified address convention. Communication with the device in an embodiment uses but is not limited to the following address convention:
innodevID@service_domain/serviceID. This address convention is used for example to send and receive real-time device control command or device information to and from the device and the activeCare service platform. The serviceID portion or component of the address convention is an identification number that is used to represent the logical active session ongoing between the device and the servicing agent during the service call.

Figure 2:
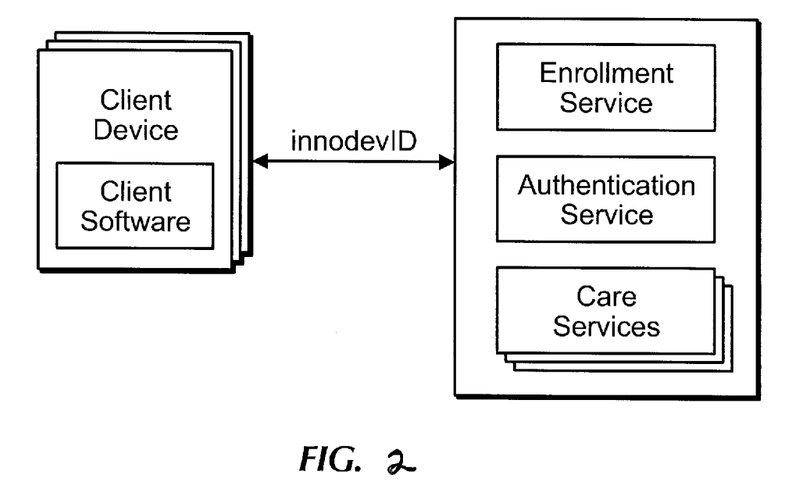
FIG. 2 is another block diagram of a device management service, under an embodiment.

FIG. 2 is another block diagram of a device management service, under an embodiment. The device management service includes a platform, system and/or components comprising one or more of an enrollment service, authentication service and care services or care applications, all of which are described in detail herein. The device management service communicates with one or more client devices, each hosting client software. Communication between the device management service and the client devices involves the use of a unique identification, referred to herein as innodevID, as described in detail herein.

Figure 3:
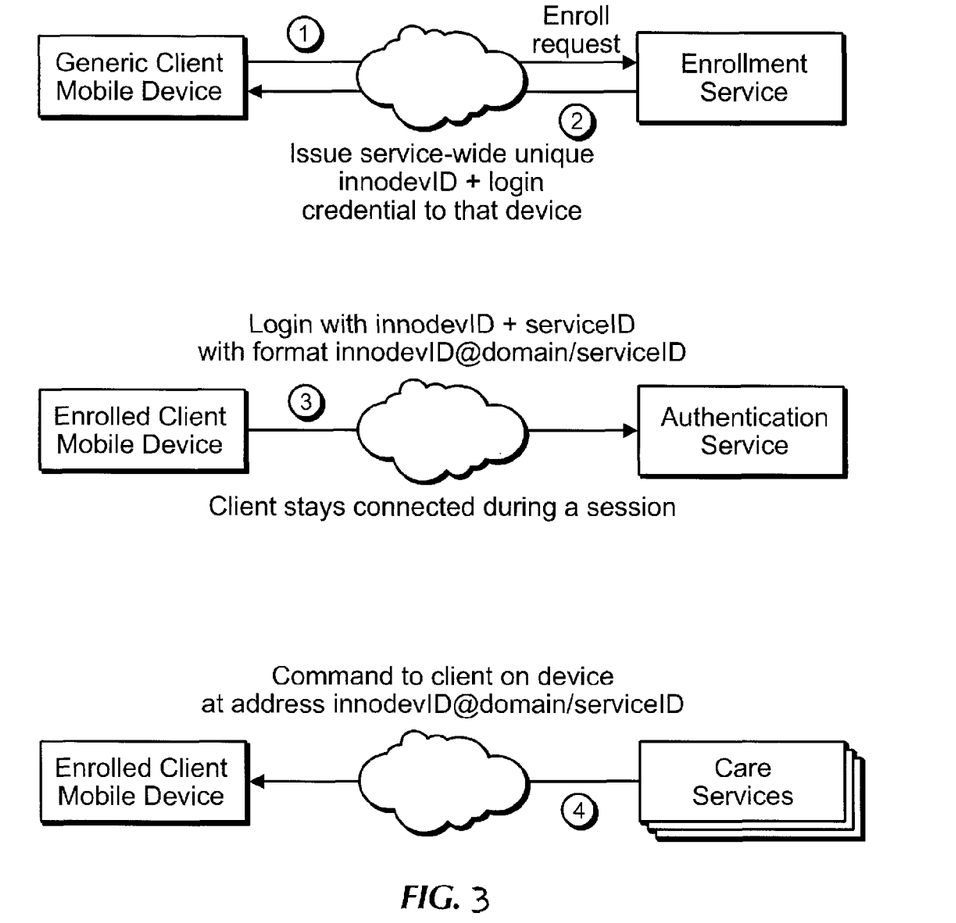
FIG. 3 is a flow diagram for provisioning a client device and assigning a universal identification to the client device, under an embodiment.

FIG. 3 is a flow diagram for provisioning a client device and assigning a universal identification the client device, under an embodiment. The universal identification assigned to the client device is used by care applications in management of the device, as described below. The client device includes any portable communication device having a wired and/or wireless communication interface by which the device interacts with one or more care applications in a local or remote environment, but is not so limited. The client device couples or connects to the care applications using a communication path that includes any medium for communicating among the computing systems including, but not limited to, wireless couplings and/or connections, wired couplings and/or connections, and hybrid wireless/wired couplings and/or connections. The care services are provided by care applications that include but are not limited to applications hosted on one or more local desktop computers and/or server computers. Further, the care applications include one or more services including but not limited to public services, private services, and/or personal services deploying as cloud or non-cloud based services.

The client device of an embodiment includes one or more applications or modules, referred to herein as client software or software, downloaded from a software distribution service via a communication path and installed on the client device. The client software is loaded onto the device via a user-initiated download from a software distribution program, for example. Alternatively, the client software is loaded onto the device via an automatic download, but the embodiment is not so limited.

As yet another alternative, the client software can be loaded onto the device using a hybrid procedure that includes an automatic procedure combined with some user action. In but one example of a hybrid procedure, the care services send to the client device an electronic message (e.g., electronic mail, SMS, etc.) that includes a link or icon for use in downloading the client software. Following receipt of the electronic message, the user clicks or selects the link or icon in the message and this user action initiates the download of the client software.

Once loaded onto a host client device, the client software of an embodiment is instructed to initiate an enrollment request to a care application but is not so limited. Alternatively, the client software self-recognizes its pre-enrollment state and in response initiates an enrollment request to a care application.

The enrollment request of an embodiment includes a set of information including but not limited to a prearranged enrollment request key and client device-specific information. The device information includes one or more of mobile device identification number, manufacturer serial number, Ethernet MAC address, carrier information, and additional information describing the state of the client device. The information of the enrollment request is sent to the care enrollment service. The care enrollment service upon receiving an enrollment request uses the client device information included in the enrollment request along with information of a knowledge base to which it is coupled to determine if the client device has previously been enrolled.

If a determination is made that the requesting client device has not been enrolled, a unique device identification number, referred to herein as innodevID, is generated by the care application in the application domain. Once generated, the innodevID is issued and assigned to the particular requesting client device. In the case where the enrollment service is hosted or running in multiple locations, such as regional data centers, the unique device identification number includes additional information identifying the location generating the unique device identification number. If a determination is made that the requesting client device has previously been enrolled, then the unique device identification number previously issued during the enrollment is again returned to the requesting client device.

The care enrollment service responds to the enrollment request with the assigned unique device identification number along with an encrypted login credential. The login credential is used for any service request to the care application. Upon receipt of the enrollment response from the care enrollment service, the client software stores the unique device identification and login credential for subsequent use in future service requests. In further response to receipt of the enrollment response, the client software couples or connects to the care application using the unique device identification and the login credential over a secure communication channel such as transport layer security (TLS) and secured sockets layer (SSL), but is not so limited.

Once the requesting client device receives the unique device identification number from the device management service, the care application and its modules or components communicate with the client device using this unique device identification. The unique device identification of an embodiment is in the form of innodevID@domain/serviceID.

The serviced component of the device identification, referred to herein as the service identification notation, is a string of characters and/or numbers assigned to identify an active session between the client device and the care application. As such, the care application and its modules communicate with the client device using this unique device identification regardless of a current location of the client device and regardless of a location of the application modules. Furthermore, the established communication session or path remains connected from the logical perspective of both the client software and the care application until such time as one of the client software and the care application terminate the application session and disconnect the coupling or connection. For example, the client device can connect to the care service via a mobile data network at the start of a session; and during the session the client device switches and connects to a WiFi network. Regardless of the change in the connection during the session, the care application continues to address the client software using the assigned unique client device identifier.

Embodiments described herein include a method comprising receiving at a platform device data of each of a plurality of client devices. The method comprises storing the device data of the plurality of client devices in a plurality of device files. The method comprises replicating the plurality of device files at a plurality of distribution platforms. The method comprises downloading to each client device the device file corresponding to the device. The downloading is performed from a distribution platform geographically closest to the client device. The method comprises evaluating the downloaded device file with the device data on the client device and determining when a new device file is available for the client device. The method comprises downloading from an update server the new device file when the determining indicates the new device data file is available.

Embodiments described herein include a method comprising: receiving at a platform device data of each of a plurality of client devices; storing the device data of the plurality of client devices in a plurality of device files; replicating the plurality of device files at a plurality of distribution platforms; downloading to each client device the device file corresponding to the device, wherein the downloading is performed from a distribution platform geographically closest to the client device; evaluating the downloaded device file with the device data on the client device and determining when a new device file is available for the client device; and downloading from an update server the new device file when the determining indicates the new device data file is available.

The device data comprises data of a firmware version currently hosted on the device.

Each device file comprises a version control file that includes firmware version data of a corresponding client device.

Each device file corresponds to each client device.

The plurality of distribution platforms is remote to the platform and in different geographical regions.

The method comprises generating a plurality of updated device files by updating the plurality of device files as new device data becomes available for the plurality of client devices.

The method comprises propagating the plurality of updated device files to the plurality of distribution platforms.

The downloading of the device file to each client device is periodic.

The evaluating is performed at the client device and comprises comparing of a current firmware version of the client device with device data of the downloaded device file.

The new device file comprises a new firmware image for the client device.

The method comprises receiving at the platform an enrollment request from each client device, wherein the enrollment request comprises a request key and the device data of the client device. The method comprises generating a device identification and issuing the device identification to the client device in the absence of a previous enrollment event. The method comprises generating a response to the client device, wherein the response is a response to the enrollment request and includes the device identification. The method comprises controlling subsequent sessions between the client device and the platform using the device identification.

The subsequent sessions each use an address convention comprising the device identification, wherein the address convention includes a service identification component that represents a logical active session between the client device and the platform, and a service domain identification component.

The method comprises initiating the enrollment request in a client application hosted on the client device, wherein the initiating comprises one of instructing the client application to initiate the enrollment request, and automatically initiating the enrollment request at the client application when the client application self-recognizes a pre-enrollment state.

The device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network-Number (MSISDN), a media access control (MAC) address, carrier data of a carrier corresponding to the client device, and state data of the client device.

The device identification includes location data of a location from which the device identification is issued.

The response includes a login credential, wherein the login credential is encrypted, comprising establishing a session between a client application of the client device and the platform upon receipt of the response.

Embodiments described herein include a system comprising a central platform comprising a plurality of device files.

The plurality of device files include device data of the plurality of client devices. The system comprises a plurality of distribution platforms coupled to the central platform. The plurality of distribution platforms comprises replicated versions of the plurality of device files. A distribution platform geographically closest to each client device downloads to each client device the device file corresponding to the device. The downloaded device file is evaluated with the device data on the client device and a determination made when a new device file is available for the client device. The system comprises an update server coupled to the central platform. The new device file is downloaded from the update server when the determining indicates the new device data file is available.

Embodiments described herein include a system comprising: a central platform comprising a plurality of device files, wherein the plurality of device files include device data of the plurality of client devices; a plurality of distribution platforms coupled to the central platform, wherein the plurality of distribution platforms comprises replicated versions of the plurality of device files, wherein a distribution platform geographically closest to each client device downloads to each client device the device file corresponding to the device, wherein the downloaded device file is evaluated with the device data on the client device and a determination made when a new device file is available for the client device; and an update server coupled to the central platform, wherein the new device file is downloaded from the update server when the determining indicates the new device data file is available.

The device data comprises data of a firmware version currently hosted on the device.

Each device file comprises a version control file that includes firmware version data of a corresponding client device, wherein each device file corresponds to each client device.

The plurality of distribution platforms is remote to the platform and in different geographical regions.

A plurality of updated device files are generated by updating the plurality of device files as new device data becomes available for the plurality of client devices, wherein the plurality of updated device files are propagated to the plurality of distribution platforms.

The downloading of the device file to each client device is periodic.

The device file is evaluated at the client device and comprises comparing of a current firmware version of the client device with device data of the downloaded device file.

The new device file comprises a new firmware image for the client device.

The platform receives an enrollment request from each client device, wherein the enrollment request comprises a request key and the device data of the client device, wherein a device identification is generated and issued to the client device in the absence of a previous enrollment event, wherein a response is generated to the client device, wherein the response is a response to the enrollment request and includes the device identification, wherein subsequent sessions between the client device and the platform are controlled using the device identification.

The subsequent sessions each use an address convention comprising the device identification, wherein the address convention includes a service identification component that represents a logical active session between the client device and the platform, and a service domain identification component.

The enrollment request is initiated in a client application hosted on the client device, wherein the initiating comprises one of instructing the client application to initiate the enrollment request, and automatically initiating the enrollment request at the client application when the client application self-recognizes a pre-enrollment state.

The device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network-Number (MSISDN), a media access control (MAC) address, carrier data of a carrier corresponding to the client device, and state data of the client device.

The device identification includes location data of a location from which the device identification is issued.

The response includes a login credential, wherein the login credential is encrypted, comprising establishing a session between a client application of the client device and the platform upon receipt of the response.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The device management service can be a component of a single system, multiple systems, and/or geographically separate systems. The device management service can also be a subcomponent or subsystem of a single system, multiple systems, and/or geographically separate systems. The device management service can be coupled to one or more other components (not shown) of a host system or a system coupled to the host system.

One or more components of the device management service and/or a corresponding system or application to which the device management service is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the device management service can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the device management service and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the device management service and corresponding systems and methods include: microcontrollers with memory (such as electronically erasable programmable read only memory (EEPROM)), embedded microprocessors, firmware, software, etc. Furthermore, aspects of the device management service and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the device management service and corresponding systems and methods is not intended to be exhaustive or to limit the systems and methods to the precise forms disclosed. While specific embodiments of, and examples for, the device management service and corresponding systems and methods are described herein for illustrative purposes, various equivalent modifications are possible within the scope of the systems and methods, as those skilled in the relevant art will recognize. The teachings of the device management service and corresponding systems and methods provided herein can be applied to other systems and methods, not only for the systems and methods described above.

The elements and acts of the various embodiments described above can be combined to provide further embodiments. These and other changes can be made to the device management service and corresponding systems and methods in light of the above detailed description.

What is claimed is:

1. A method of operating a device management platform, the method comprising:
   receiving device data from each of a plurality of client devices;
   storing the device data in a plurality of device files, each device file including firmware version information for a corresponding client device;
   replicating the plurality of device files to a plurality of distribution platforms; and
   for each client device of the plurality of client devices:
   selecting one of the plurality of distribution platforms to transmit a corresponding one of the plurality of device files to the client device, wherein the selected distribution platform is the distribution platform that is geographically closest to the client device; and
   enabling an update server to transmit a new device data file to the client device based at least in part on the corresponding device file.

2. The method of claim 1, wherein each device file corresponds to a respective client device.

3. The method of claim 1, wherein each of the plurality of distribution platforms is located in a different geographical region that is remote to the device management platform.

4. The method of claim 1, further comprising generating a plurality of updated device data files by updating the plurality of device files as new device data becomes available for the plurality of client devices.

5. The method of claim 4, further comprising propagating the plurality of updated device data files to the plurality of distribution platforms.

6. The method of claim 1, wherein the selected distribution platform is to periodically transmit the corresponding device file to the client device.

7. The method of claim 1, wherein the client device is to determine that the new device data file is available by comparing a current firmware version of the client device with the firmware version information of the corresponding device file.

8. The method of claim 1, wherein the new device data file comprises a new firmware image for the client device.

9. The method of claim 1, comprising:
   receiving an enrollment request from each client device, wherein the enrollment request comprises a request key and the device data of the client device;
   generating a device identification for the client device;

transmitting a response to the client device, wherein the response includes the device identification; and controlling subsequent sessions between the client device and the device management platform using the device identification.

10. The method of claim 9, wherein the subsequent sessions each use an address convention comprising the device identification, wherein the address convention includes a service identification component that represents a logical active session between the client device and the platform, and a service domain identification component.

11. The method of claim 9, wherein the device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network-Number (MSISDN), a media access control (MAC) address, carrier data of a carrier corresponding to the client device, and state data of the client device.

12. The method of claim 9, wherein the device identification includes location data of a location for which the device identification was generated.

13. The method of claim 9, wherein the response includes an encrypted login credential, the method further comprising establishing a session with a client application of the client device after transmitting the response.

14. A device management platform comprising:
one or more processors; and
a memory storing instructions that, when executed by the one or more processors, cause the device management platform to:
receive device data from each of a plurality of client devices;
store the device data in a plurality of device files, wherein each device file includes firmware version information for a corresponding client device;
replicate the plurality of device files to a plurality of distribution platforms; and
for each client device of the plurality of client devices:
select one of the plurality of distribution platforms to transmit a corresponding one of the plurality of device files to the client device, wherein the selected distribution platform is the distribution platform that is geographically closest to the client device; and
enable an update server to transmit a new device data file to the client device based at least in part on the corresponding device file.

15. The device management platform of claim 14, wherein each of the plurality of distribution platforms is located in a different geographical region that is remote to the device management platform.

16. The device management platform of claim 14, wherein execution of the instructions further causes the device management platform to:

generate a plurality of updated device data files by updating the plurality of device files as new device data becomes available for the plurality of client devices; and propagate the plurality of updated device data files to the plurality of distribution platforms.

17. The device management platform of claim 14, wherein the selected distribution platform is to periodically transmit the corresponding device file to the client device.

18. The device management platform of claim 14, wherein the client device is to determine that the new device data file is available by comparing a current firmware version of the client device with the firmware version information of the corresponding device file.

19. The device management platform of claim 14, wherein the new device data file comprises a new firmware image for the client device.

20. The device management platform of claim 14, wherein execution of the instructions further causes the device management platform to:
receive an enrollment request from each client device, wherein the enrollment request comprises a request key and the device data of the client device;
generate a device identification for the client device;
transmit a response to the client device, wherein the response includes the device identification; and
control subsequent sessions between the client device and the device management platform using the device identification.

21. The device management platform of claim 20, wherein the subsequent sessions each use an address convention comprising the device identification, wherein the address convention includes a service identification component that represents a logical active session between the client device and the platform, and a service domain identification component.

22. The device management platform of claim 20, wherein the device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network-Number (MSISDN), a media access control (MAC) address, carrier data of a carrier corresponding to the client device, and state data of the client device.

23. The device management platform of claim 20, wherein the device identification includes location data of a location for which the device identification was generated.

24. The device management platform of claim 20, wherein the response includes an encrypted login credential and wherein execution of the instructions further causes the device management platform to establish a session with a client application of the client device after transmitting the response.

* * * * *